US012633751B2

(12) United States Patent
Tai et al.

(10) Patent No.: US 12,633,751 B2
(45) Date of Patent: May 19, 2026

(54) POWER-TAKING CIRCUIT, PARALLEL-TYPE PHOTOVOLTAIC COMPONENT CONTROL DEVICE, AND PHOTOVOLTAIC STRING POWER DISTRIBUTION SYSTEM

(71) Applicant: SUZHOU UKT NEW ENERGY TECHNOLOGY CO., LTD., Suzhou (CN)

(72) Inventors: Xiaojun Tai, Suzhou (CN); Yichi Zhang, Suzhou (CN); Degui Zhou, Suzhou (CN)

(73) Assignee: SUZHOU UKT NEW ENERGY TECHNOLOGY CO., LTD., Suzhou (CN)

( * ) Notice: Subject to any disclaimer, the term of this patent is extended or adjusted under 35 U.S.C. 154(b) by 199 days.

(21) Appl. No.: 18/778,319

(22) Filed: Jul. 19, 2024

(65) Prior Publication Data

US 2025/0286382 A1 Sep. 11, 2025

(30) Foreign Application Priority Data

Mar. 8, 2024 (CN) .......................... 202410268729.0

(51) Int. Cl.
*H02J 3/38* (2026.01)
*H02H 7/20* (2006.01)
(Continued)

(52) U.S. Cl.
CPC ................. *H02J 3/38* (2013.01); *H02H 7/20* (2013.01); *H02J 3/007* (2020.01); *H02S 50/00* (2013.01); *H02J 2101/24* (2026.01)

(58) Field of Classification Search
CPC .... H02J 3/38; H02J 3/007; H02H 7/20; H02S 50/00
See application file for complete search history.

(56) References Cited

U.S. PATENT DOCUMENTS 9,812,868 B2 * 11/2017 Robbins ................. H02S 40/34
2012/0300347 A1 * 11/2012 Fahrenbruch ......... H10F 77/955
361/1

(Continued)

FOREIGN PATENT DOCUMENTS

CN 105720913 A 6/2016
CN 114865685 A 8/2022
(Continued)

*Primary Examiner* — Scott Bauer
(74) *Attorney, Agent, or Firm* — Birch, Stewart, Kolasch & Birch, LLP

(57) ABSTRACT

The present disclosure relates to a power-taking circuit suitable for use in conjunction with a bypass circuit of a photovoltaic component, a parallel-type photovoltaic component control device, and a photovoltaic string power distribution system. In embodiments of the present disclosure, the power-taking circuit includes a pump-type voltage clamped circuit configured to release and output energy to generate a first internal voltage in a case that the bypass circuit is turned on, and generate the first internal voltage according to an output voltage of the photovoltaic component and store the energy in a case that the bypass circuit is turned off; and a comparison circuit configured to generate a first control signal according to the first internal voltage so that the bypass circuit is controlled to be turned off or turned on according to the first control signal.

11 Claims, 6 Drawing Sheets

(51) Int. Cl.
    *H02J 3/007*        (2026.01)
    *H02S 50/00*        (2014.01)
    *H02J 101/24*       (2026.01)

(56)                References Cited

U.S. PATENT DOCUMENTS

| | | |
|---|---|---|
| 2014/0368058 A1 | 12/2014 | Orr et al. |
| 2016/0164457 A1 | 6/2016 | Robbins |
| 2018/0083450 A1 | 3/2018 | Truong et al. |
| 2018/0287484 A1* | 10/2018 | Braginsky ............... H02M 1/32 |
| 2020/0394889 A1* | 12/2020 | Hasegawa ............. G06F 3/1293 |
| 2021/0249867 A1* | 8/2021 | Har-Shai ............... H10F 77/955 |
| 2025/0132570 A1* | 4/2025 | Hassan-Ali ............. H02J 3/381 |

FOREIGN PATENT DOCUMENTS

| | | |
|---|---|---|
| JP | 2014-11386 A | 1/2014 |
| WO | WO 2022/257215 A1 | 12/2022 |

\* cited by examiner

POWER-TAKING CIRCUIT, PARALLEL-TYPE PHOTOVOLTAIC COMPONENT CONTROL DEVICE, AND PHOTOVOLTAIC STRING POWER DISTRIBUTION SYSTEM

CROSS-REFERENCE TO RELATED APPLICATIONS

The present disclosure claims priority to Chinese patent application No. 2024102687290, filed on Mar. 8, 2024, entitled "POWER-TAKING CIRCUIT, PARALLEL-TYPE PHOTOVOLTAIC COMPONENT CONTROL DEVICE, AND PHOTOVOLTAIC STRING POWER DISTRIBU-TION SYSTEM", which is incorporated herein by reference in its entirety.

TECHNICAL FIELD

The present disclosure relates to the field of photovoltaic technology, and in particular, to a power-taking circuit, a parallel-type photovoltaic component control device, and a photovoltaic string power distribution system.

BACKGROUND

A photovoltaic component control device (e.g., a photovoltaic component rapid turn-off device, etc.) is an important part of a photovoltaic power distribution system and is mainly used to control power supply output of a photovoltaic component. Thus, when a safety problem or a safety failure occurs in the photovoltaic power distribution system, for example, an output voltage and temperature of the photovoltaic component in the photovoltaic power distribution system are abnormal or a fire occurs, the photovoltaic component control device can control the photovoltaic component to respond quickly to stop (i.e., turn off) the normal power output of the photovoltaic component, thereby realizing rapid turn-off to ensure the safe and effective operation of the photovoltaic power distribution system.

Therefore, how to ensure the continuous and stable power supply of the photovoltaic component control device is crucial, and in a case that the photovoltaic component is turned off, how to ensure the stable power supply of the photovoltaic component control device so that it can operate normally is crucial.

SUMMARY

In view of the above, embodiments of the present disclosure provide a power-taking circuit suitable for use in conjunction with a bypass circuit of a photovoltaic component, a parallel-type photovoltaic component control device, and a photovoltaic string power distribution system.

In a first aspect, an embodiment of the present disclosure provides a power-taking circuit used in conjunction with a bypass circuit of a photovoltaic component. The power-taking circuit may include:

a pump-type voltage clamped circuit configured to release and output energy to generate a first internal voltage in a case that the bypass circuit is turned on, and generate the first internal voltage according to an output voltage of the photovoltaic component and store the energy in a case that the bypass circuit is turned off, wherein the first internal voltage is used to provide a power supply voltage; and a comparison circuit configured to generate a first control signal according to the first internal voltage, so that in a case that the first control signal is enabled and the first internal voltage satisfies an energy storage condition, the bypass circuit is controlled to be turned off according to the first control signal, and in a case that the first control signal is enabled and the first internal voltage satisfies an energy release condition, the bypass circuit is controlled to be turned on according to the first control signal.

In combination with the first aspect, in an optional implementation, the pump-type voltage clamped circuit may include a clamping capacitor circuit and a clamping diode circuit.

The clamping capacitor circuit may be configured to form a discharge loop with the bypass circuit in the case that the bypass circuit is turned on, form a charge loop with a positive electrode and a negative electrode of the photovoltaic component in the case that the bypass circuit is turned off, and have first ports respectively located in the discharge loop and the charge loop and configured to output the first internal voltage.

The clamping diode circuit may be configured to perform reverse clamping in a case that the clamping capacitor circuit releases and outputs energy to obtain the first internal voltage.

In combination with the first aspect, in an optional implementation, the pump-type voltage clamped circuit may include a sample circuit.

The sample circuit may be configured to sample the first internal voltage to obtain a second internal voltage and output the second internal voltage for the comparison circuit to generate the first control signal.

In combination with the first aspect, in an optional implementation, the comparison circuit may include a hysteresis comparator.

The hysteresis comparator may be configured to generate the first control signal according to the second internal voltage to control turn-on or turn-off of the bypass circuit.

In combination with the first aspect, in an optional implementation, the comparison circuit may include a voltage stabilized circuit.

The voltage stabilized circuit may be configured to provide a reference voltage to the hysteresis comparator.

In combination with the first aspect, in an optional implementation, the power-taking circuit may include a voltage regulated and stabilized circuit.

The voltage regulated and stabilized circuit may be configured to convert the first internal voltage into one or more power supply voltages with different voltage values and output the one or more power supply voltages.

In a second aspect, an embodiment of the present disclosure provides a parallel-type photovoltaic component control device. The parallel-type photovoltaic component control device may include a bypass circuit and the above-described power-taking circuit suitable for use in conjunction with the photovoltaic component bypass circuit.

The bypass circuit may be connected between a positive electrode and a negative electrode of the photovoltaic component and may be configured to be turned on or off under common control of a second control signal and a first control signal output by the power-taking circuit, and the second control signal may be used to provide information comprising whether the photovoltaic component needs to be bypassed.

In combination with the second aspect, in an optional implementation, the bypass circuit may include an anti-reverse protection circuit and a controllable switched circuit.

The controllable switched circuit may be configured to be turned on or turned off under the control of a bypass control signal to achieve the turn-on or turn-off of the bypass circuit, wherein the bypass control signal may be determined according to the first control signal and the second control signal.

The anti-reverse protection circuit may be connected in series with the controllable switched circuit and configured to prevent reverse current from flowing into the positive electrode of the photovoltaic component.

In combination with the second aspect, in an optional implementation, the parallel-type photovoltaic component control device may include a driving circuit configured to determine and generate the bypass control signal according to the first control signal and the second control signal.

In combination with the second aspect, in an optional implementation, the parallel-type photovoltaic component control device may include a controller, a voltage detection circuit, and a temperature detection circuit.

The voltage detection circuit may be configured to obtain and output an output voltage of the photovoltaic component.

The temperature detection circuit may be configured to obtain and output temperature of the photovoltaic component.

The controller may be configured to determine and output the second control signal according to the output voltage and the temperature.

In a third aspect, an embodiment of the present disclosure provides a photovoltaic component power distribution system including a photovoltaic component array and one or more above-described parallel-type photovoltaic component control devices.

The photovoltaic component array may include one or more photovoltaic components connected in parallel or series.

The parallel-type photovoltaic component control device may be configured to control output of the one or more photovoltaic components.

The beneficial effects provided by the embodiments of the present disclosure include: by the pump-type voltage clamped circuit and the comparison circuit, continuous and stable power supply voltage can be provided under both the normal power supply output and the turn-off of the photovoltaic component, thereby avoiding generating overvoltage and undervoltage and improving the power supply stability of various internal circuits of the control device. By combining with the parallel-type photovoltaic component control device, the defects of a series-type photovoltaic component control device can be overcome, the energy loss of the series-connected switching transistor in normally ON state can be eliminated, the output power of the photovoltaic component can be improved, and a faulty photovoltaic component can be removed independently without affecting the normal operation of the system, thereby improving the reliability and stability of the system.

Additional aspects and advantages of the embodiments of the present disclosure will be set forth in part in the following description, and in part will be obvious from the following description, or may be learned by practice of the embodiments of the present disclosure.

BRIEF DESCRIPTION OF DRAWINGS

The accompanying drawings, which are incorporated in and constitute a part of the description, illustrate embodi-

Figure 1:
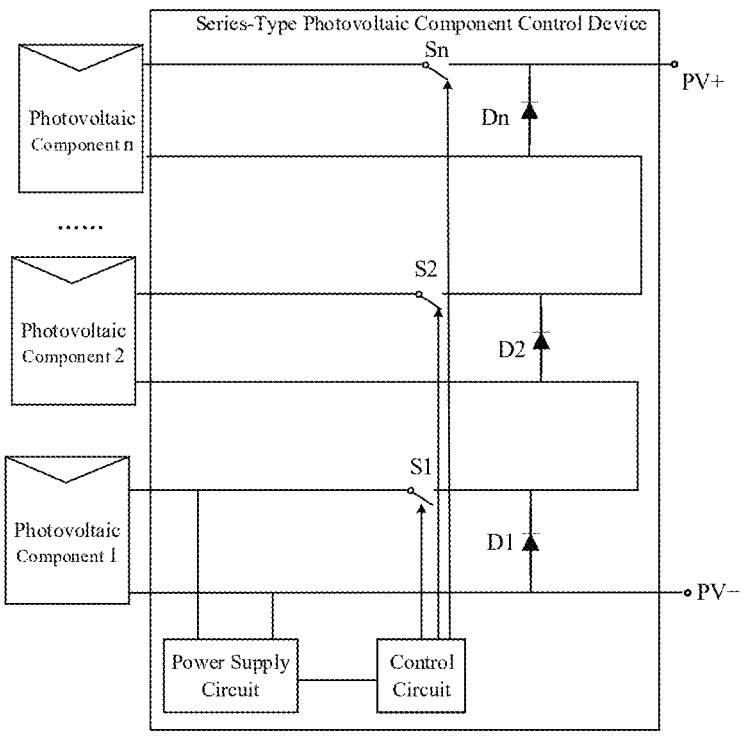
Figure 2:
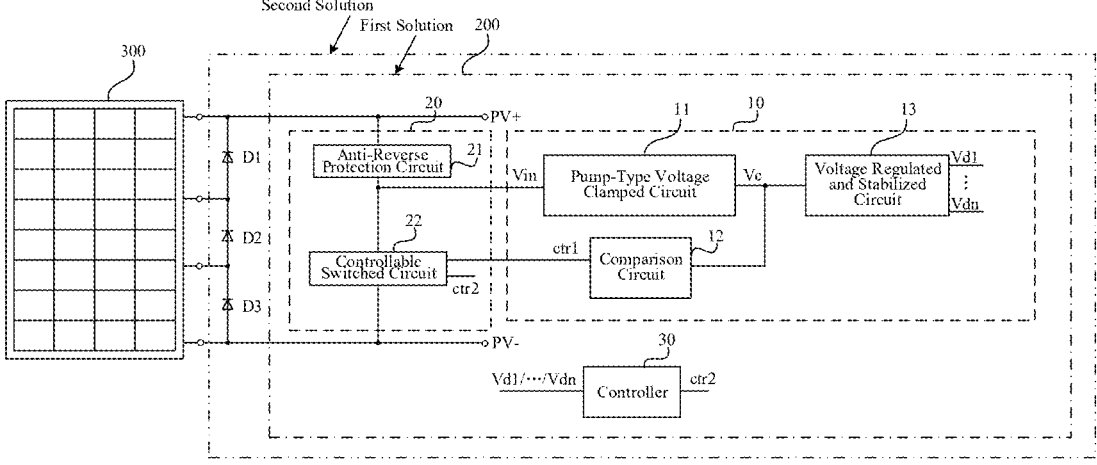
Figure 3:
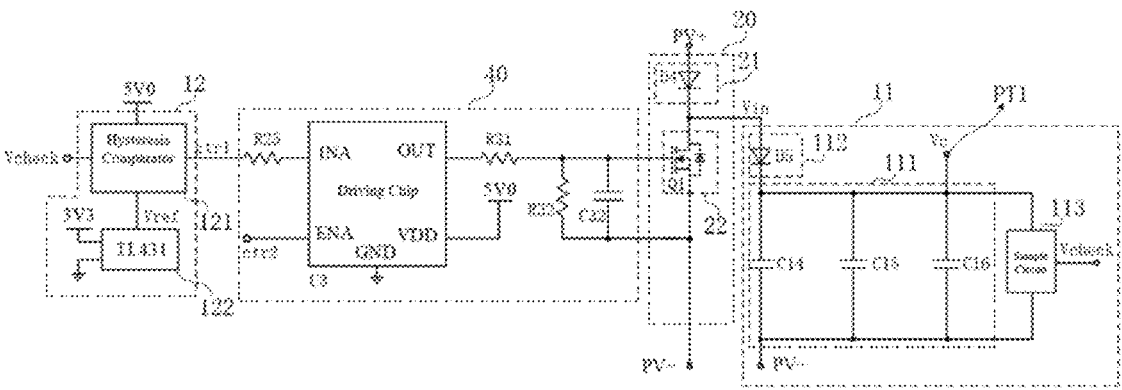
Figure 4:
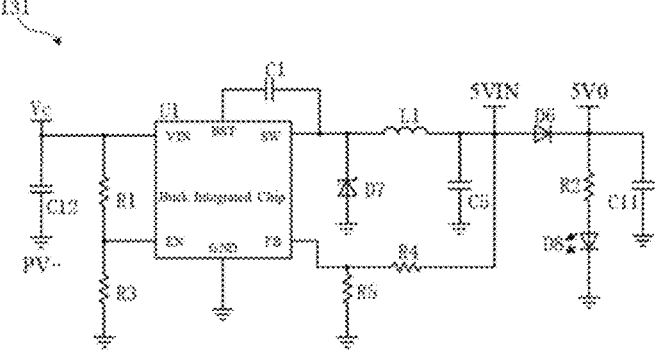
Figure 5:
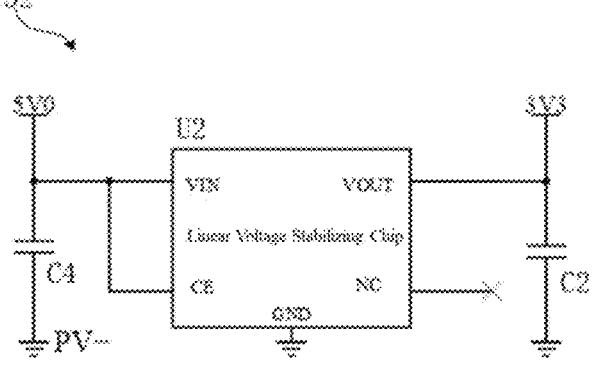
Figure 6:
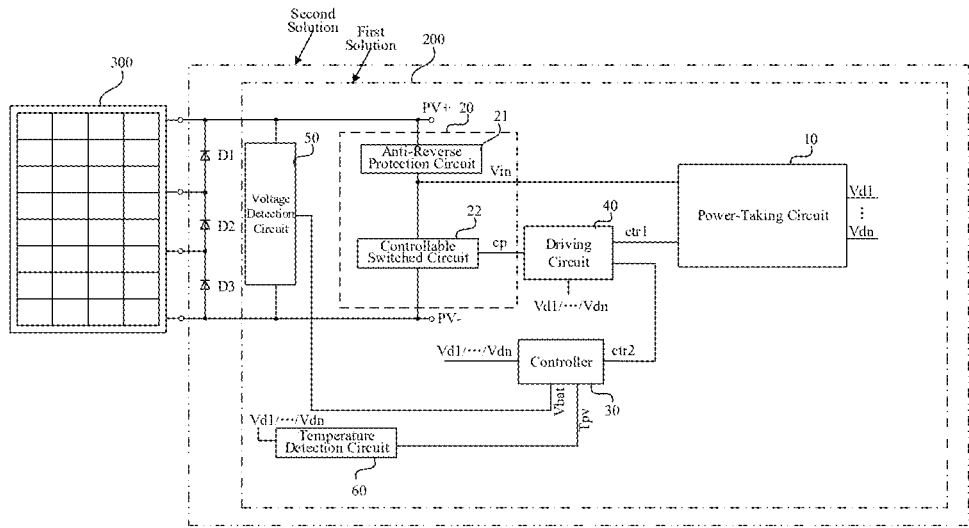
Figure 7:
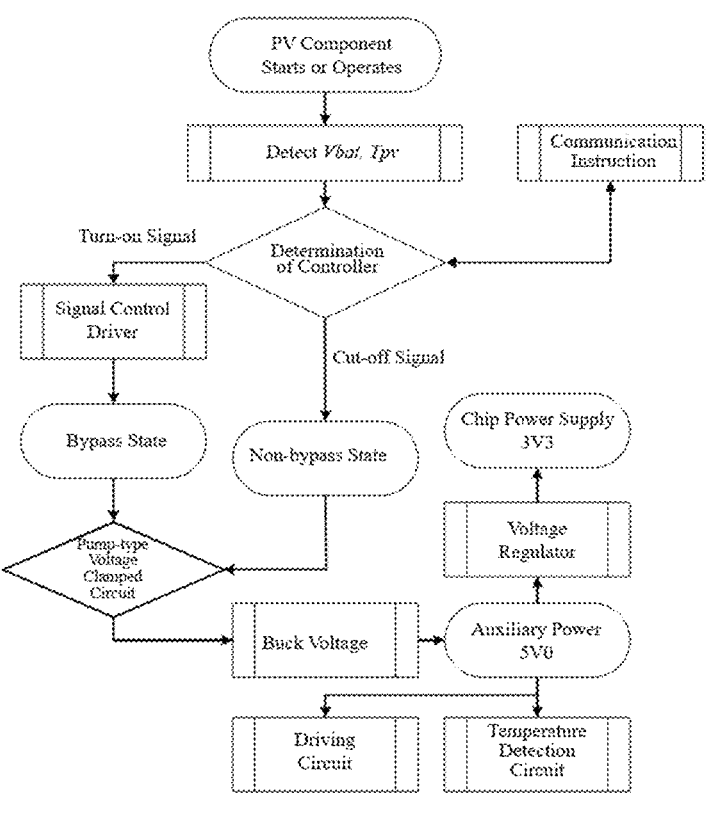
Figure 8:
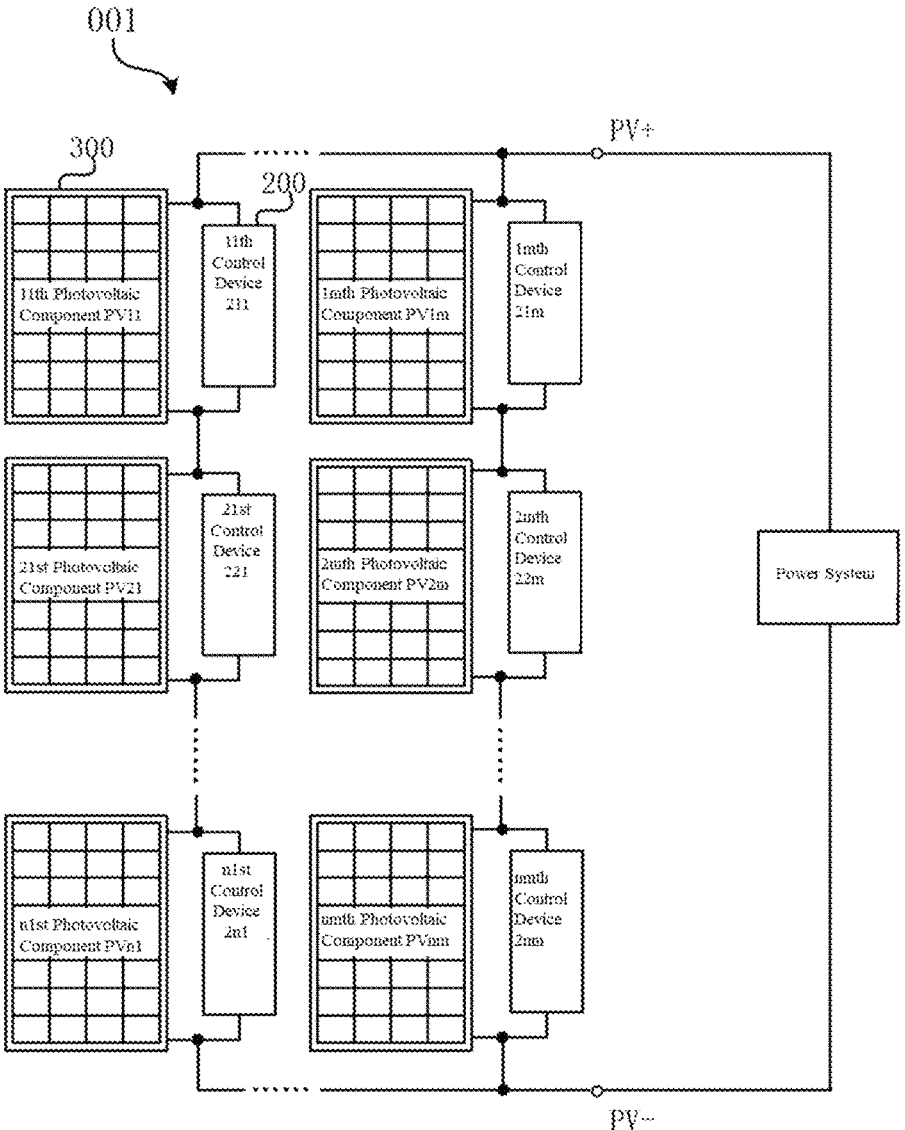
Figure 9:
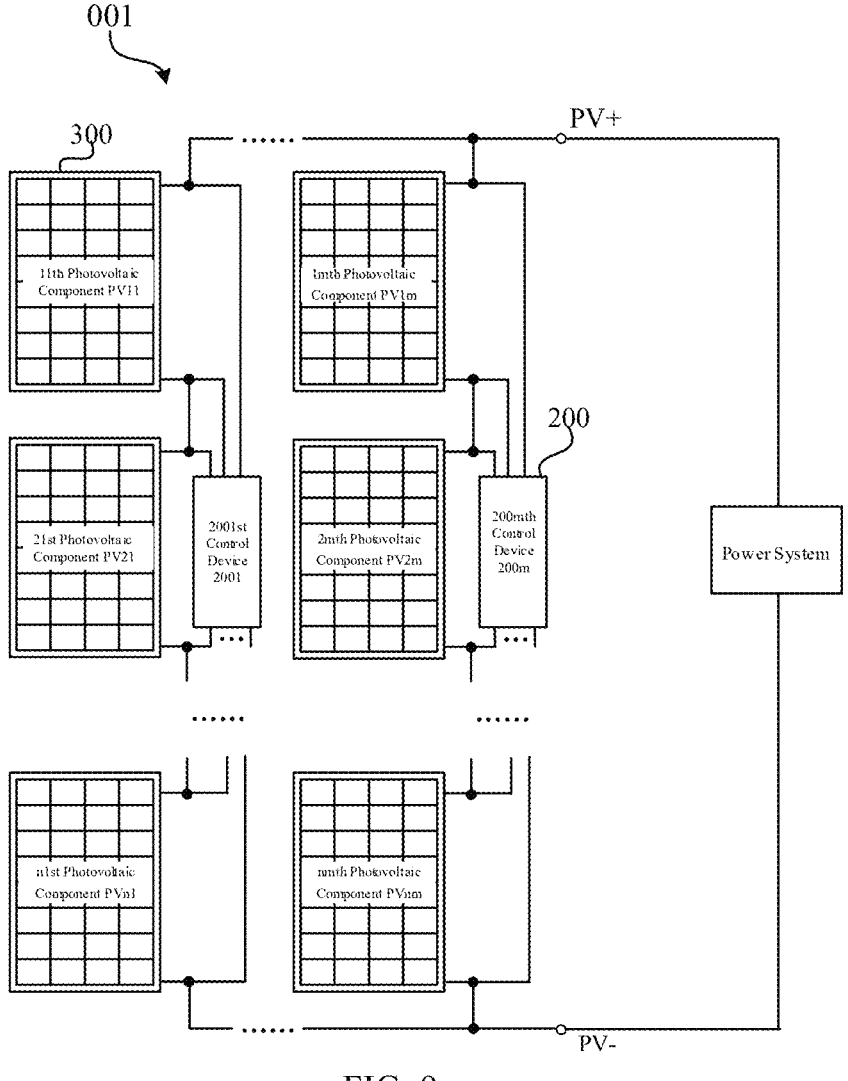

4 ments consistent with the present disclosure, and serve to explain the principle of the present disclosure together with the description. In order to more clearly illustrate the technical solutions of the embodiments of the present disclosure, the drawings needed to describe the embodiments will be briefly introduced as follows. Obviously, for those skilled in the art, other drawings can be obtained from these drawings without making creative work. These drawings and text descriptions are not intended to limit the scope of the concept of the present disclosure in any way, but are intended to illustrate the concept of the present disclosure for those skilled in the art with reference to specific embodiments. In the drawings:

FIG. 1 is a schematic block diagram illustrating a series-type photovoltaic component control device;

FIG. 2 is a schematic block diagram illustrating a specific example of a power-taking circuit suitable for use in conjunction with a bypass circuit of a photovoltaic component in an embodiment of the present disclosure;

FIG. 3 is a circuit diagram illustrating a specific example of a pump-type voltage clamped circuit in an embodiment of the present disclosure;

FIG. 4 is a circuit diagram illustrating a specific example of a buck circuit in an embodiment of the present disclosure;

FIG. 5 is a circuit diagram illustrating a specific example of a voltage regulator in an embodiment of the present disclosure;

FIG. 6 is a schematic block diagram illustrating a specific example of a bypass circuit in an embodiment of the present disclosure;

FIG. 7 is an operation flow chart illustrating a specific example of a parallel-type photovoltaic component control device in an embodiment of the present disclosure;

FIG. 8 is a schematic block diagram illustrating a specific example of a single-control type photovoltaic string power distribution system in an embodiment of the present disclosure;

FIG. 9 is a schematic block diagram illustrating a specific example of a multi-control type photovoltaic string power distribution system in an embodiment of the present disclosure.

DETAILED DESCRIPTION

To make the technical solutions and beneficial effects of the present disclosure more obvious and understandable, detailed descriptions are given below by enumerating specific embodiments. The drawings are not necessarily drawn to scale, and a local feature may be enlarged or reduced to more clearly show the details of the local feature. Unless defined otherwise, technical or scientific terms used herein have the same meaning as those in the technical field to which the embodiments of the present disclosure belong.

It should be noted that the terms "first", "second", or the like may be used herein to describe various elements, but these elements are not limited by these terms. These terms are only used to distinguish one element from another. When a "first" one is described, it does not mean that there must be a "second" one. When a "second" one is discussed, it does not mean that there must be a first one in the present disclosure. The singular forms "a", "an", and "said/the" may be intended to include the plural forms as well, unless the context clearly indicates otherwise. The term "comprise/include" specifies the presence of the included feature, but does not preclude the presence or addition of one or more other features. The term "and/or" includes any and all combinations of the associated listed items. The term "a plurality of" means two or more. The term "connection" may be a direct connection between two parts, an indirect connection established through other parts, an internal connection between two parts, or any other possible connection forms.

As shown in FIG. 1, series-connected switching transistors S1, S2, . . . , Sn exist in a series-type photovoltaic component control device and configured to control the turn-on and turn-off of power supply output of a photovoltaic component, thereby realizing the protection of the photovoltaic component and a power system. When a switching transistor is in a normally closed state under the control of a control circuit, a photovoltaic component corresponding to the switching transistor (e.g., a photovoltaic component corresponding to the switching transistor S1 may be photovoltaic component 1, and other corresponding relationships may be deduced by analogy) may operate normally. When a safety problem or safety failure of the photovoltaic component occurs, the switching transistor may be turned off under the control of the control circuit, which will turn off the photovoltaic component corresponding to the switching transistor, thereby protecting the safety of the photovoltaic component and the system. Therefore, the power supply circuit can stably, continuously, and reliably provide power supply voltage to various circuits inside the control device, thereby ensuring the normal operation of the control device, and thus effectively protecting the safety of the photovoltaic component and the system.

Moreover, a series-type control device may have the following defects. When the photovoltaic component operates normally, the turn-on switching transistor consumes a large amount of energy. It has high requirements on turn-off logic and timing control, and a complex control system needs to be equipped, which may increase the cost. When a first switching transistor is turned off, the first switching transistor needs to withstand high voltage stress of a photovoltaic string, and a risk of overvoltage breakdown exists.

To this end, on the basis of adopting a parallel-type photovoltaic component control device to overcome the defects of the series-type photovoltaic component control device, an embodiment of the present disclosure proposes a power-taking circuit suitable for use in conjunction with a bypass circuit of a photovoltaic component, which can continuously and stably provide a power supply voltage to the parallel-type photovoltaic component control device in cases that the photovoltaic component normally supplies power output and is bypassed, thereby ensuring stable power supply and making the photovoltaic component control device operate normally. As shown in FIG. 2, a power-taking circuit 10 suitable for use in conjunction with a bypass circuit 20 of a photovoltaic component 300 includes:

a pump-type voltage clamped circuit 11 configured to release and output energy to generate a first internal voltage Vc in a case that the bypass circuit 20 is turned on, and generate the first internal voltage Vc according to an output voltage of the photovoltaic component and store energy in a case that the bypass circuit 20 is turned off, where the first internal voltage Vc is used to provide a power supply voltage; and a comparison circuit 12 configured to generate a first control signal ctr1 according to the first internal voltage Vc, so that in a case the first control signal ctr1 is enabled and the first internal voltage Vc satisfies an energy storage condition, the bypass circuit 20 is controlled to be turned off according to the first control signal ctr1, and in a case the first control signal ctr1 is enabled and the first internal voltage Vc satisfies an energy release condition, the bypass circuit 20 is controlled to be turned on according to the first control signal ctr1.

In an embodiment of the present disclosure, a parallel-type photovoltaic component control device 200 includes the bypass circuit 20. The bypass circuit 20 may be connected between a positive electrode PV+ and a negative electrode PV− of the photovoltaic component 300, be configured to be connected in parallel with the photovoltaic component 300, and be controlled to be turned on or off, so that the photovoltaic component 300 is bypassed or normally supplies power output. For example, a voltage input end of the bypass circuit 20 may be connected to the positive electrode PV+ of the photovoltaic component 300, and a voltage output end of the bypass circuit 20 may be connected to the negative electrode PV− of the photovoltaic component 300.

The bypass circuit 20 is configured to be turned on or off under common control of the first control signal ctr1 and a second control signal ctr2. For example, the first control signal ctr1 and the second control signal ctr2 may have an "AND" logical relationship. When the second control signal ctr2 maintains at a high level, the first control signal ctr1 can be enabled, that is, the turn-on and turn-off of the bypass circuit 20 can be controlled according to the change of the high and low levels of the first control signal ctr1. In the parallel-type photovoltaic component control device 200, a controller 30 may provide the second control signal ctr2, which may be used as a control signal for switching between a "bypass state" and a "non-bypass state" of the parallel-type photovoltaic component control device 200. For example, if the second control signal ctr2 is at a high level, it may indicate that the parallel-type photovoltaic component control device 200 is in the "bypass state", and if the second control signal ctr2 is at a low level, it may indicate that the parallel-type photovoltaic component control device 200 is in the "non-bypass state". That is to say, in the case that the first control signal ctr1 is enabled, the parallel-type photovoltaic component control device 200 is in the "bypass state". At this time, the first control signal ctr1 can control the turn-on and turn-off of the bypass circuit 20. On the contrary, since the second control signal ctr2 is at a low level, the change of high and low levels of the first control signal ctr1 will not cause an "AND" result of the first control signal ctr1 and the second control signal ctr2, and thus the first control signal ctr1 may be not enabled, the bypass circuit 20 may be always turned off, and the parallel-type photovoltaic component control device 200 may be in the "non-bypass state".

If the parallel-type photovoltaic component control device 200 is in the "non-bypass state", the photovoltaic component 300 may supply power output normally. For example, an output voltage of the photovoltaic component 300 may be between 17 V and 60 V. At this time, the bypass circuit 20 is turned off, and the pump-type voltage clamped circuit 11 may generate the first internal voltage Vc to provide the power supply voltage according to the output voltage of the photovoltaic component 300, thereby ensuring the continuous and stable power supply. Moreover, at this time, the pump-type voltage clamped circuit 11 may reach saturation in the process of energy storage or after completing the energy storage.

If the parallel-type photovoltaic component control device 200 is in the "bypass state", the photovoltaic component 300 may be bypassed (may be regarded as being turned off, and the normal power supply output is closed), that is, an output voltage between the positive electrode PV+ and the negative electrode PV− of the photovoltaic component 300 may depend on a voltage difference between the voltage input end and the voltage output end of the bypass circuit 20. At this time, the output voltage of the photovoltaic component 300 is basically zero, which may form undervoltage. If the power supply voltage is still provided according to the output voltage of the photovoltaic component 300, the unstable power supply of the photovoltaic component control device may be easily caused. Therefore, at this time, the energy release (such as discharge) of the pump-type voltage clamped circuit 11 can be applied to generate the first internal voltage Vc, and the power supply voltage may be provided according to the first internal voltage Vc, which can maintain the stability of the power supply. As the energy is released continually, the first internal voltage Vc may gradually decrease. When the first internal voltage Vc meets the energy storage condition (for example, when the first internal voltage Vc is lower than the lowest voltage threshold, e.g., the lowest voltage threshold is 7V), it may not be possible to ensure a stable power supply, and the pump-type voltage clamped circuit 11 needs to store energy (such as charged). Therefore, the bypass circuit 20 can be controlled to be turned off to store energy for the pump-type voltage clamped circuit 11, and the first internal voltage Vc may be generated according to the voltage output characteristics of the photovoltaic component 300, thereby achieving continuous and stable power supply. The output voltage of the photovoltaic component 300 gradually increases, and when the first internal voltage Vc generated according to the output voltage of the photovoltaic component 300 increases to meet the energy release condition (for example, when the first internal voltage Vc is higher than the highest voltage threshold, e.g., the highest voltage threshold is 13V), the bypass circuit 20 is controlled again to be turned on, which can prevent overvoltage. The time for the pump-type voltage clamped circuit 11 to store energy to the required energy is generally less than the time for generating the first internal voltage Vc using the output voltage of the photovoltaic component 300 i.e., during the time which the first internal voltage Vc is generated according to the output voltage of the photovoltaic component 300, the pump-type voltage clamped circuit 11 can store enough energy to obtain the desired first internal voltage Vc when releasing and outputting the energy. For example, the first internal voltage Vc may vary between 7V and 13V, and a waveform of the first internal voltage Vc may have a sawtooth shape.

A specific structure of the comparison circuit 12 may be set according to actual needs. For example, it may be implemented by an algorithm design using a DSP, an FPGA, and other chips, or it may also be implemented by using an analog circuit composed of an operational amplifier, such as a hysteresis comparator, etc.

By adopting the pump-type voltage clamped circuit and the comparison circuit, the embodiment of the present disclosure can provide a continuous and stable power supply voltage in a case that the photovoltaic component normally supplies power output and in a case that the photovoltaic component is turned off, thereby avoiding overvoltage and undervoltage, and improving the power supply stability of various internal circuits of the control device. By combining with the parallel-type photovoltaic component control device, the defects of a series-type photovoltaic component control device can be overcome, the energy loss caused by the normally ON of the switching transistors connected in series can be eliminated, the output power of the photovoltaic component can be improved, a faulty photovoltaic component can be removed independently without affecting the normal operation of the system, thereby improving the reliability and stability of the system.

The photovoltaic component 300 may include several cell units, a positive electrode of each cell unit may be connected to a cathode of a diode, and a negative electrode of the cell unit may be connected to an anode of the diode, thereby forming a reverse parallel connection of the diode and a unidirectional channel of the power supply of the photovoltaic component. By connecting a diode in reverse parallel to each cell unit, a unidirectional channel of the power supply can be formed, which can play the role of protection. For example, as shown in FIG. 2, the photovoltaic component 300 may include three cell units, a first cell unit may be connected in reverse parallel with a first diode D1, a second cell unit may be connected in reverse parallel with a second diode D2, and a third cell unit may be connected in reverse parallel with a third diode D3. The diodes connected in reverse parallel may be replaced by other devices with unidirectional turn-on functions to protect the cell units, and it is not limited to use diodes. In a first solution of the parallel-type photovoltaic component control device 200, the diodes connected in reverse parallel may be not included, for example, the first diode D1, the second diode D2, and the third diode D3 may be not included. In the second solution of the parallel-type photovoltaic component control device 200, the diodes connected in reverse parallel may be included.

In an optional implementation, as shown in FIG. 3, the pump-type voltage clamped circuit 11 may include a clamping capacitor circuit 111 and a clamping diode circuit 112.

The clamping capacitor circuit 111 may be configured to form a discharge loop with the bypass circuit 20 in a case that the bypass circuit 20 is turned on, to form a charging loop with the positive and negative electrodes of the photovoltaic component in a case that the bypass circuit 20 is turned off, and to have first ports PT1 located in the discharge circuit and the charging circuit respectively and configured to output the first internal voltage Vc.

The clamping diode circuit 112 may be configured to perform reverse clamping in a case that the clamping capacitor circuit 111 releases and outputs energy to obtain the first internal voltage Vc.

In an embodiment of the present disclosure, both the clamping capacitor circuit 111 and the clamping diode circuit 112 may be set according to actual needs. For example, the clamping capacitor circuit 111 may include one or more capacitors connected in parallel. The clamping diode circuit 112 may include one or more diodes connected in series. A diode in the clamping diode circuit 112 may be in a reverse biased state during an energy release and discharge process, so that the voltage output by the first port PT1 can be clamped at the first internal voltage Vc, thereby improving the power supply stability. As a specific example, the clamping capacitor circuit 111 may include a fourteenth capacitor C14, a fifteenth capacitor C15, and a sixteenth capacitor C16, and the clamping diode circuit 112 may include a fifth diode D5. A first end of the fourteenth capacitor C14, the fifteenth capacitor C15, and the sixteenth capacitor C16 connected in parallel may be connected to a cathode of the fifth diode D5, and a second end of the fourteenth capacitor C14, the fifteenth capacitor C15, and the sixteenth capacitor C16 connected in parallel may be connected to the negative electrode PV− of the photovoltaic component. An anode of the fifth diode D5 may be connected to a first end of a controllable switched circuit 22 in the bypass circuit 20, and a second end of the controllable switched circuit 22 may be connected to the negative electrode PV− of the photovoltaic component, so that when the controllable switched circuit 22 is controlled to be turned on, the bypass circuit 20 may be turned on, the discharge circuit may be turned on, and the fourteenth capacitor C14, the fifteenth capacitor C15, and the sixteenth capacitor C16 can release energy and discharge. For example, the controllable switched circuit 22 may be composed of a controllable semiconductor switched device, or the like. The controllable semiconductor switched device may include at least one of a BJT (transistor), an SCR (silicon controlled thyristor), a GTO (gate turn-off thyristor), a MOSFET (metal-oxide-semiconductor field-effect transistor, MOS transistor for short), an IGBT (insulated gate bipolar transistor), a MCT (MOS controlled thyristor), and a SIT (static induction transistor), etc. Correspondingly, when the controllable switched circuit 22 is controlled to be turned off, the bypass circuit 20 may be turned off, the charging circuit may be turned on, and the fourteenth capacitor C14, the fifteenth capacitor C15, and the sixteenth capacitor C16 may charge and store energy.

In an optional implementation, the pump-type voltage clamped circuit 11 may further include a sample circuit 113.

The sample circuit 113 may be configured to sample the first internal voltage Vc to obtain a second internal voltage Vcheck and output the second internal voltage Vcheck for the comparison circuit 12 to generate the first control signal ctr1.

In an embodiment of the present disclosure, the sample circuit 113 may be set according to actual needs. For example, a voltage dividing resistor network may be used to divide the first internal voltage Vc and perform resistor sampling on the divided first internal voltage Vc to obtain the second internal voltage Vcheck, which may reduce the voltage amplitude value and improve the impedance matching.

In an optional implementation, the comparison circuit 12 may include a hysteresis comparator 121.

The hysteresis comparator 121 may be configured to generate the first control signal ctr1 according to the second internal voltage Vcheck to control the turn-on or turn-off of the bypass circuit 20.

In an embodiment of the present disclosure, a hysteresis interval of the hysteresis comparator 121 may be set according to actual needs, for example, it may be set between 1.8V and 3.1V. When the second internal voltage Vcheck is greater than 3.1V, the hysteresis comparator 121 may output the first control signal ctr1 with a first level to control the bypass circuit 20 to be turned on. When the second internal voltage Vcheck is less than 1.8V, the hysteresis comparator 121 may output the first control signal ctr1 with a second level to control the bypass circuit 20 to be turned off. The first level and the second level are different. For example, the first level may be a high level and the second level may be a low level. The high level and low level in the present disclosure may be relative values and are not limited to absolute values.

In an optional implementation, the comparison circuit 12 may further include a voltage stabilized circuit 122.

The voltage stabilized circuit 122 may be configured to provide a reference voltage Vref to the hysteresis comparator 121.

In an embodiment of the present disclosure, the voltage stabilized circuit 122 can convert the power supply voltage (such as 3.3V) provided by the power-taking circuit 10 to obtain a more stable reference voltage as the reference voltage of the hysteresis comparator, thereby improving the operation stability of the hysteresis comparator. The voltage stabilized circuit 122 may be set according to actual needs, for example, it may be a three-terminal voltage stabilized circuit. For example, the three-terminal voltage stabilized circuit may adopt a TL431 chip.

In an optional implementation, as shown in FIG. 2, the power-taking circuit 10 may also include a voltage regulated and stabilized circuit 13.

The voltage regulated and stabilized circuit 13 may be configured to convert the first internal voltage Vc into one or more power supply voltages with different voltage values and output them.

In an embodiment of the present disclosure, the voltage regulated and stabilized circuit 13 may be set according to actual needs to obtain the power supply voltages Vd1, Vd2, . . . , Vdn with required voltage values, n is a natural number. For example, the voltage regulated and stabilized circuit 13 may output voltages of 5.0V, 3.3V, etc., which can play the role of voltage regulation and voltage stabilization. The voltage regulation of the voltage regulated and stabilized circuit 13 can realize voltage boosting and/or voltage bucking, that is, one or more different voltage values output by it may have a value greater than or less than the first internal voltage Vc, or have both values, which may be set according to actual needs. The power supply voltages Vd1, Vd2, . . . , Vdn can respectively supply power to each internal circuit in the parallel-type photovoltaic component control device 200, such as the controller 30, the voltage stabilized circuit 122, etc., and further improve the stability of the power supply voltage, thereby ensuring the stable and continuous power supply. As a specific example, as shown in FIG. 4, the voltage regulated and stabilized circuit 13 may include a buck circuit 131. The buck circuit 131 may be composed of a buck integrated chip, etc. The buck circuit 131 may output the first stabilized voltage 5V0, and include a buck integrated chip U1, a first resistor R1, a second resistor R2, a third resistor R3, a fourth resistor R4, a fifth resistor R5, a first capacitor C1, a twelfth capacitor C12, a fifth capacitor C5, an eleventh capacitor C11, a first inductor L1, a seventh Zener diode D7, a sixth diode D6, and an eighth light-emitting diode D8. A VIN end of the buck integrated chip U1 may be connected to a first end of the first resistor R1 and a first end of the twelfth capacitor C12 respectively and configured to input the first internal voltage Vc. An EN terminal of the buck integrated chip U1 may be respectively connected to a second end of the first resistor R1 and a first end of the third resistor R3. A BST end of the buck integrated chip U1 may be connected to a first end of the first capacitor C1. An SW end of the buck integrated chip U1 may be connected to a second end of the first capacitor C1, a cathode of the seventh Zener diode D7, and a first end of the first inductor L1. A FB end of the buck integrated chip U1 may be connected to a first end of the fourth resistor R4 and a first end of the fifth resistor R5, respectively. A second end of the first inductor L1 may be connected to a first end of the fifth capacitor C5 and a second end of the fourth resistor R4 respectively, and configured to output a first voltage 5VIN. A second end of the twelfth capacitor C12, a second end of the third resistor R3, a GND end of the buck integrated chip U1, a second end of the fifth resistor R5, an anode of the seventh Zener diode D7, and a second end of the fifth capacitor C5 may be connected to the negative electrode PV− of the photovoltaic component, respectively. The buck integrated chip U1 may be selected according to actual needs.

In order to stabilize the first voltage 5VIN output by the buck circuit 131, an output end of which may be connected to the sixth diode D6 to form a clamping stabilizing circuit for unidirectional charging to obtain a first stabilized voltage 5V0 as one of the power supply voltages. For example, the first stabilized voltage 5V0 may be 5.0V. The second resistor R2 and the eighth light-emitting diode D8 may form a unidirectional discharge circuit to prevent overvoltage of the power supply. If the eighth light-emitting diode D8 emits light, the first stabilized voltage 5V0 may have a certain electric energy, and the eleventh capacitor C11 may filter waves to stabilize the first stabilized voltage 5V0. The twelfth capacitor C12 may be an input voltage stabilizing capacitor, which may play a role of filtering and stabilizing voltage. The first resistor R1 and the third resistor R3 may be voltage dividing resistors connected in series, which may provide an enable signal to the EN end to control the operation state of the buck integrated chip U1. For example, when the enable signal has a relatively high level, the buck integrated chip U1 may operate. Conversely, when the enable signal has a relatively low level, the buck integrated chip U1 may not operate. By connecting the first capacitor C1 (a bootstrap capacitor) between the BST end and the SW end in series, a driving voltage may be provided for driving a power switching transistor in the buck integrated chip U1. The seventh Zener diode D7 can stabilize the output port voltage. The first inductor L1 may be a filter inductor, and form an LC filter structure with the fifth capacitor C5, which can filter out high-frequency harmonics, thereby stabilizing the output DC voltage, i.e., the first voltage 5VIN. The fourth resistor R4 and the fifth resistor R5 can sample the first voltage 5VIN and feed it back to the buck integrated chip U1 through the FB end.

As another specific example, as shown in FIG. 5, the voltage regulated and stabilized circuit 13 may include a voltage regulator 132 in addition to the buck circuit 131. The voltage regulator 132 may be composed of a linear voltage stabilizing chip, or the like, and may continually convert the first stabilized voltage 5V0 to obtain the second stabilized voltage 3V3 as another power supply voltage. For example, the second stabilized voltage 3V3 may be 3.3V. The voltage regulator 132 may include a linear voltage stabilizing chip U2, a second capacitor C2, and a fourth capacitor C4. A VIN end and a CE end of the linear voltage stabilizing chip U2 may be connected and respectively connected to a first end of the fourth capacitor C4, and configured to input the first stabilized voltage 5V0. A VOUT end of the linear voltage stabilizing chip U2 may be connected to a first end of the second capacitor C2 and configured to output the second stabilized voltage 3V3. A second end of the fourth capacitor C4, a second end of the second capacitor C2, and a GND end of the linear voltage stabilizing chip U2 may be respectively connected to the negative electrode PV– of the photovoltaic component. The linear voltage stabilizing chip U2 may be selected according to actual needs. The fourth capacitor C4 may be an input filter capacitor, which can stabilize the input power. The CE end may be an enable port of the linear voltage stabilizing chip U2 and connected to the first stabilized voltage 5V0. The second capacitor C2 may be an output filter capacitor, connected to the VOUT end, and can stably output DC power.

The embodiment of the present disclosure also provides a parallel-type photovoltaic component control device. As shown in FIG. 2, the parallel-type photovoltaic component control device 200 may include a bypass circuit 20 and the above-mentioned power-taking circuit 10 suitable for use in conjunction with the bypass circuit of the photovoltaic component.

The bypass circuit 20 is connected between the positive electrode PV+ and the negative electrode PV– of the photovoltaic component 300 and configured to be turned on or turned off under the common control of the second control signal ctr2 and the first control signal ctr1 output by the power-taking circuit 10. The second control signal ctr2 is used to provide information including whether the photovoltaic component 300 needs to be bypassed.

In an embodiment of the present disclosure, the second control signal ctr2 may be provided by the controller 30, may be provided by a control circuit composed of a CMOS circuit, or may be provided in other ways, which may be set according to actual needs. A controlled action process of the bypass circuit 20 may be referred to the above description and will not be repeated herein. In an embodiment of the present disclosure, the volt-ampere characteristics of the photovoltaic component and the unidirectional voltage clamping characteristics of the diode can be comprehensively considered, a pump-type voltage clamping power-taking manner can be adopted, which can prevent overvoltage or undervoltage of the power voltage and ensure the power supply stability of the parallel-type photovoltaic component control device.

FIG. 2 shows the first and second solutions of the parallel-type photovoltaic component control device 200, the main difference of which lies in whether an anti-parallel diode is included. More details can refer to the above description and will not be repeated herein.

In an optional implementation, as shown in FIG. 6, the bypass circuit 20 may include an anti-reverse protection circuit 21 and a controllable switched circuit 22.

The controllable switched circuit 22 may be configured to be turned on or off under the control of a bypass control signal cp to realize the turn-on or turn-off of the bypass circuit 20. The bypass control signal cp may be determined according to the first control signal ctr1 and the second control signal ctr2.

The anti-reverse protection circuit 21 may be connected in series with the controllable switched circuit 22 and configured to limit reverse current from flowing into the positive electrode PV+ of the photovoltaic component 300.

In an optional implementation, the parallel-type photovoltaic component control device 200 may further include a driving circuit 40 configured to determine and generate the bypass control signal cp according to the first control signal ctr1 and the second control signal ctr2.

In an embodiment of the present disclosure, the controllable switched circuit 22 may be directly or indirectly controlled by the first control signal ctr1 and the second control signal ctr2 according to different internal circuit structures of the controllable switched circuit 22, which may be set according to actual needs. The composition of the controllable switched circuit 22 may be referred to the above description and will not be repeated herein. For example, it is disclosed above that the bypass control signal cp may be determined and generated according to the first control signal ctr1 and the second control signal ctr2 through the driving circuit 40 to control the turn-on and turn-off of the controllable switched circuit 22, thereby realizing the indirect control of the controllable switched circuit 22, so that it can be combined with the control of the power-taking circuit 10, and on the basis of correcting the defects of the series-type photovoltaic component control device, a continuous and stable power supply voltage for the parallel-type photovoltaic component control device can be provided, thereby avoiding the occurrence of overvoltage and undervoltage, and improving the overall stability of the control device and system.

As a specific example, as shown in FIG. 3, the anti-reverse protection circuit 21 may include a fourth diode D4. The controllable switched circuit 22 may include a switching transistor Q1. An anode of the fourth diode D4 may be connected to the positive electrode PV+ of the photovoltaic component. A cathode of the fourth diode D4 may be connected to a first end of the switching transistor Q1, and a second end of the switching transistor Q1 may be connected to the negative electrode PV− of the photovoltaic component. A control end of the switching transistor Q1 may be configured to input a bypass control signal cp. The driving circuit 40 may include a driving chip U3, a twenty-fifth resistor R25, a thirty-first resistor R31, a thirty-second resistor R32, and a thirty-second capacitor C32. An ENA end of the driving chip U3 may be connected to a first end of the twenty-fifth resistor R25. A second end of the twenty-fifth resistor R25 may be configured to input the first control signal ctr1, and an INA end of the driving chip U3 may be configured to input the second control signal ctr2. An OUT end of the driving chip U3 may be connected to the first end of the thirty-first resistor R31. A second end of the thirty-first resistor R31 may be connected to the first end of the thirty-second resistor R32 and the first end of the thirty-second capacitor C32 respectively and configured to output the bypass control signal cp. A second end of the thirty-second resistor R32, a second end of the thirty-second capacitor C32, and a GND end of the driving chip U3 may be respectively connected to the negative electrode PV− of the photovoltaic component. A VDD end of the driving chip U3 may be configured to input the first stabilized voltage 5V0. The driving chip U3 may be selected according to actual needs. For example, a logic circuit chip may be used to implement the AND operation of the first control signal ctr1 and the second control signal ctr2.

The positive electrode PV+ of the photovoltaic component may be connected in series with an anti-reverse power diode (i.e., the fourth diode D4), which may form a controllable unidirectional bypass turn-on channel. The fourth diode D4 may control the forward flow of current in the bypass circuit of the photovoltaic component, limit the reverse flow of current, and prevent the reverse current from passing through a body diode of the MOS transistor and disabling the original protection diode (e.g., the first diode D1, the second diode D2, and the third diode D3 in FIG. 2). By using only one main power diode (i.e., the fourth diode D4) as a unidirectional current clamp, the voltage drop power loss when a plurality of diodes are connected in series can be reduced, and the temperature rise problem caused by the voltage drop loss can be solved, thereby improving system stability and reducing the cost of product basic elements. The twenty-fifth resistor R25 may be a current limiting resistor. The thirty-first resistor R31 may be an output resistor, which may improve the impedance matching. The thirty-second resistor R32 may be a charge and discharge resistor, and the thirty-second capacitor C32 may be a charge and discharge capacitor.

In an optional implementation, the parallel-type photovoltaic component control device 200 may also include a controller 30, a voltage detection circuit 50, and a temperature detection circuit 60.

The voltage detection circuit 50 may be configured to obtain a voltage Vbat output by the photovoltaic component 300 and output it.

The temperature detection circuit 60 may be configured to obtain a temperature Tpv of the photovoltaic component 300 and output it.

The controller 30 may be configured to determine and output the second control signal ctr2 according to the voltage Vbat and the temperature Tpv output by the photovoltaic component 300.

In an embodiment of the present disclosure, the power supply of the controller 30, the voltage detection circuit 50, and the temperature detection circuit 60 may be one of the power supply voltages Vd1, Vd2, . . . , Vdn output by the power-taking circuit, thereby improving operation stability. The controller 30 can realize local control of the power generation of the photovoltaic component 300. When the photovoltaic component 300 generates power, the illumination and cell panel temperature will affect the cell panel current. Within a certain range, the stronger the illumination is, the greater the output current is, and the higher the temperature is, the smaller the output voltage is. When the photovoltaic component 300 fails, the photovoltaic curve voltage is very small. Therefore, whether a failure occurs may be determined by the voltage Vbat obtained by the voltage detection circuit 50 and the temperature Tpv obtained by the temperature detection circuit 60. For example, if a failure occurs, the controller 30 may output a second control signal (such as a high level) including information that the photovoltaic component needs to be bypassed, and may control the bypass circuit 20 to be turned on unidirectionally, thereby protecting the photovoltaic component 300, and thus realizing the monitor of the single component status of the photovoltaic component. Therefore, the protection of photovoltaic components can be more accurate.

In an optional implementation, the parallel-type photovoltaic component control device 200 may further include a communication module. Illustratively, the communication module and the controller 30 may be packaged in one chip. A remote control signal may be received through the communication module to realize the remote control of the photovoltaic component 300. For example, when a special situation such as a house fire occurs and the photovoltaic component 300 needs to be remotely controlled to be turned off, the controller 30 may receive a remote control signal through the communication module to control the bypass circuit 20 to be turned on, so that the photovoltaic component 300 can be bypassed. The communication module can be a short distance communication module or a telecommunication module. The short distance communication module may include at least one of a Bluetooth module, a WIFI module, a ZigBee module, an Ethernet module, a serial interface module, and a parallel interface module, etc. The telecommunication module may include at least one of a GPRS module, a 2G module, a 3G module, a 4G module, a 5G module, and an LTE module, etc.

FIG. 7 shows an operation flow of a parallel-type photovoltaic component control device. When the photovoltaic component (PV component) 300 starts or operates, the voltage detection circuit 50 may detect the voltage Vbat output by the photovoltaic component, and the temperature detection circuit may output the temperature Tpv of the photovoltaic component. A communication instruction and/or a sample signal may be input into the controller 30 to determine the turn-off state of the switching transistor Q1. A turn-on signal may drive the switching transistor Q1 to be turned on, the control device may enter a "bypass state", and the pump-type voltage clamped circuit 11 may operate. When the voltages of the capacitors (C14, C15, and C16) are greater than the maximum voltage threshold (such as 13V), the capacitors (C14, C15, and C16) may be discharged to provide the power supply voltage. When the voltages of the capacitors (C14, C15, and C16) are less than the minimum voltage threshold (such as 7V), the driving circuit may output a cut-off signal, the switching transistor Q1 may be cut off, and the photovoltaic component may charge the capacitors (C14, C15, and C16). When the signal is cut off, the control device may enter a "non-bypass state" to reduce the output voltage of the photovoltaic component to provide the power supply voltage. For example, the power supply voltage may output a first stabilized voltage 5V0, or output a second stabilized voltage 3V3 through a voltage regulator.

No matter whether the parallel-type photovoltaic component control device is in the "bypass state" or the "non-bypass state", the first internal voltage Vc generated by the pump-type voltage clamped circuit is greater than the first stabilized voltage 5V0, and the pump-type voltage clamped circuit may continuously reduce the voltage and output the first stabilized voltage 5V0 to supply power to the driving circuit and the temperature detection circuit, and at the same time, the second stabilized voltage 3V3 may be output through the voltage regulator to supply power to the chip, or the like, which may ensure the normal operation of the PV component control device.

An embodiment of the present disclosure also provides a photovoltaic string power distribution system. As shown in FIGS. 8 and 9, the photovoltaic string power distribution system 001 may include a photovoltaic component array and one or more the above-mentioned parallel-type photovoltaic component control devices 200.

The photovoltaic component array may include one or more photovoltaic components 300 connected in series or in parallel.

The parallel-type photovoltaic component control device 200 may be configured to control the output of the one or more photovoltaic components 300.

In an embodiment of the present disclosure, in a single-control type photovoltaic string power distribution system 001, the power supply output of one photovoltaic component 300 may be controlled by one parallel-type photovoltaic component control device 200. For example, as shown in FIG. 8, the photovoltaic component array may include a 11th photovoltaic component PV11, a 21st photovoltaic component PV21, . . . , and a nmth photovoltaic component PVnm, where there are n×m photovoltaic components 300, and n and m are both natural numbers. Each photovoltaic component 300 may correspond to one parallel-type photovoltaic component control device 200 one by one, that is, a 11th control device 211, a 21st control device 221, . . . , a nmth control device 2nm may be included, and there are also n×m in total, which may form a photovoltaic component control device array. The photovoltaic string power distribution system 001 may control the power supply output of the photovoltaic component array through the photovoltaic component control device array, and then transmit the output to the power system to supply the power to the power system. When an accident occurs to a photovoltaic component, the bypass circuit may be quickly turned on to protect the photovoltaic component in a manner of short circuit and ensure the safety of the power system.

In a multi-control type photovoltaic string power distribution system 001, the power supply output of a plurality of photovoltaic components 300 may be controlled by one parallel-type photovoltaic component control device 200. For example, as shown in FIG. 9, the photovoltaic component array may include a 11th photovoltaic component PV11, a 21st photovoltaic component PV21, . . . , and a nmth photovoltaic component PVnm, where there are n×m photovoltaic components 300, and n and m are both natural numbers. A row of photovoltaic components 300 correspond to one parallel-type photovoltaic component control device 200 one by one, that is, a 2001st control device 2001, . . . , a 200mth control device 200m, a total of which is m, forms a photovoltaic component control device array.

Embodiments of the present disclosure relate to the fields of new energy photovoltaic power generation technology and semiconductor microelectronics, and to the field of new energy photovoltaic component-level rapid turn-off device protection, and are suitable for a power system with photovoltaic component protection and photovoltaic component array protection. In the embodiments of the present disclosure, the parallel-type photovoltaic component control device (may be referred to as the "turn-off device") can be applied to photovoltaic component arrays with different sizes. The bypass protection mechanism can avoid turn-on restriction between series-connected components, and maximize the power generated by the photovoltaic component array. In addition, the bypass protection mechanism does not cause the energy loss caused by the constant turn-on of the switching transistors connected in series in a series-type photovoltaic component control device, thereby making full use of photovoltaic power generation, and maximizing the utilization rate of light energy. The bypass protection mechanism solves the problem of high voltage stress when a first series-connected switching transistor of the photovoltaic component array is turned off and improves the safety performance of the turn-off device.

In the embodiments of the present disclosure, the bypass circuit provides a bypass unidirectional turn-on technology, and the power-taking circuit used in conjunction with the bypass circuit provides a bypass low-voltage DC power-taking technology, which solves the problem of bypass DC low-voltage power-taking, provides a stable auxiliary power supply for the turn-off device, ensures the stability of the photovoltaic component array, thereby improving the safety and efficiency of the power generation of the photovoltaic system.

In the embodiments of the present disclosure, the power-taking circuit adopts the pump-type voltage clamping mechanism to extract energy from the photovoltaic component, thereby avoiding overvoltage or undervoltage of the power supply, ensuring the stability of voltage output by the power-taking circuit and the safety of the power supply, and improving the control stability and safety performance of the turn-off device.

It should be understood that the above embodiments are exemplary and are not intended to include all possible implementations included in the claims. Various modifications and changes can also be made on the basis of the above embodiments without departing from the scope of the present disclosure. Similarly, various technical features of the above embodiments may also be combined arbitrarily to form additional embodiments of the present disclosure that may not be explicitly described. Therefore, the above embodiments only express several implementations of the present disclosure and do not limit the scope of protection of the present disclosure.

The invention claimed is:

1. A power-taking circuit suitable for use in conjunction with a bypass circuit of a photovoltaic component, comprising:

a pump-type voltage clamped circuit configured to release and output energy to generate a first internal voltage in a case that the bypass circuit is turned on, and generate the first internal voltage according to an output voltage of the photovoltaic component and store the energy in a case that the bypass circuit is turned off, wherein the first internal voltage is used to provide a power supply voltage; and a comparison circuit configured to generate a first control signal according to the first internal voltage, so that in a case that the first control signal is enabled and the first internal voltage satisfies an energy storage condition, the bypass circuit is controlled to be turned off according to the first control signal, and in a case that the first control signal is enabled and the first internal voltage satisfies an energy release condition, the bypass circuit is controlled to be turned on according to the first control signal.

2. The power-taking circuit according to claim 1, wherein the pump-type voltage clamped circuit comprises a clamping capacitor circuit and a clamping diode circuit, the clamping capacitor circuit is configured to form a discharge loop with the bypass circuit in the case that the bypass circuit is turned on, form a charge loop with a positive electrode and a negative electrode of the photovoltaic component in the case that the bypass circuit is turned off, and have first ports respectively located in the discharge loop and the charge loop and configured to output the first internal voltage, and the clamping diode circuit is configured to perform reverse clamping in a case that the clamping capacitor circuit releases and outputs energy to obtain the first internal voltage.

3. The power-taking circuit according to claim 2, wherein the pump-type voltage clamped circuit comprises a sample circuit, the sample circuit is configured to sample the first internal voltage to obtain a second internal voltage and output the second internal voltage for the comparison circuit to generate the first control signal.

4. The power-taking circuit according to claim 3, wherein the comparison circuit comprises a hysteresis comparator, the hysteresis comparator is configured to generate the first control signal according to the second internal voltage to control turn-on or turn-off of the bypass circuit.

5. The power-taking circuit according to claim 4, wherein the comparison circuit comprises a voltage stabilized circuit, the voltage stabilized circuit is configured to provide a reference voltage to the hysteresis comparator.

6. The power-taking circuit according to claim 1, wherein the power-taking circuit comprises a voltage regulated and stabilized circuit, the voltage regulated and stabilized circuit is configured to convert the first internal voltage into one or more power supply voltages with different voltage values and output the one or more power supply voltages.

7. A parallel-type photovoltaic component control device, comprising a bypass circuit and a power-taking circuit suitable for use in conjunction with the bypass circuit of a photovoltaic component according to claim 1, wherein the bypass circuit is connected between a positive electrode and a negative electrode of the photovoltaic component and is configured to be turned on or off under common control of a second control signal and a first control signal output by the power-taking circuit, and the second control signal is used to provide information comprising whether the photovoltaic component needs to be bypassed.

8. The parallel-type photovoltaic component control device according to claim 7, wherein the bypass circuit comprises an anti-reverse protection circuit and a controllable switched circuit, the controllable switched circuit is configured to be turned on or turned off under the control of a bypass control signal to achieve the turn-on or turn-off of the bypass circuit, wherein the bypass control signal is determined according to the first control signal and the second control signal; and the anti-reverse protection circuit is connected in series with the controllable switched circuit and configured to prevent reverse current from flowing into the positive electrode of the photovoltaic component.

9. The parallel-type photovoltaic component control device according to claim 8, wherein the parallel-type photovoltaic component control device comprises a driving circuit configured to determine and generate the bypass control signal according to the first control signal and the second control signal.

10. The parallel-type photovoltaic component control device according to claim 7, wherein the parallel-type photovoltaic component control device comprises a controller, a voltage detection circuit, and a temperature detection circuit, the voltage detection circuit is configured to obtain and output an output voltage of the photovoltaic component;

the temperature detection circuit is configured to obtain and output temperature of the photovoltaic component; and the controller is configured to determine and output the second control signal according to the output voltage and the temperature.

11. A photovoltaic string power distribution system, comprising a photovoltaic component array and one or more parallel-type photovoltaic component control devices according to claim 7, wherein the photovoltaic component array comprises one or more photovoltaic components connected in parallel or in series; and wherein the parallel-type photovoltaic component control device is configured to control output of the one or more photovoltaic components.

* * * * *